Sept. 11, 1951     R. E. MORGAN     2,567,725
THREE PHASE CONTROL SYSTEM EMPLOYING SATURABLE REACTORS Filed Oct. 31, 1950

Inventor:
Raymond E. Morgan,
by *Paul A. Frank*
His Attorney.

Patented Sept. 11, 1951

2,567,725

UNITED STATES PATENT OFFICE 2,567,725

THREE PHASE CONTROL SYSTEM EMPLOYING SATURABLE REACTORS

Raymond E. Morgan, Schenectady, N. Y., assignor to General Electric Company, a corporation of New York Application October 31, 1950, Serial No. 193,171

2 Claims. (Cl. 321—25)

My invention relates to control systems and, more particularly, to control systems for three phase alternating current which employ saturable reactors as the control element, and which have become known as "magnetic amplifiers."

An object of my invention is to provide a simple "magnetic amplifier" control system which provides a controllable unidirectional output voltage from a three phase alternating current source having no "neutral" or "common" conduit.

A further object of my invention is to provide an economical magnetic amplifier three phase control circuit which employs saturable reactor means having four reactance windings instead of the usual six reactance windings.

A still further object of my invention is to provide a three phase magnetic amplifier control system which does not require additional current commutating elements for inductive loads.

In general, my invention comprises saturable reactor means having two pair of reactance windings, each pair connected in circuit relation with a direct current consumption circuit or "load" through full wave double-bridge current rectifying means in a manner such that unidirectional current flows through the consumption circuit from two of the requisite three input conductors through different reactance windings to the third conductor during only four of the six alternations of one complete cycle of three phase source voltage. Commutation for inductive loads is provided by a portion of the full wave current rectifying means connected between the load and the third input conductor.

The novel features which I believe to be characteristic of my invention are set forth with particularity in the appended claims. My invention itself, however, together with further objects and advantages thereof may best be understood by reference to the following description taken in connection with the accompanying drawing in which Fig. 1 is a diagrammatic view of one embodiment of my novel control system and Fig. 2 is a schematic diagram of the control system of Fig. 1 helpful in the explanation of the operation thereof.

Figure 1:
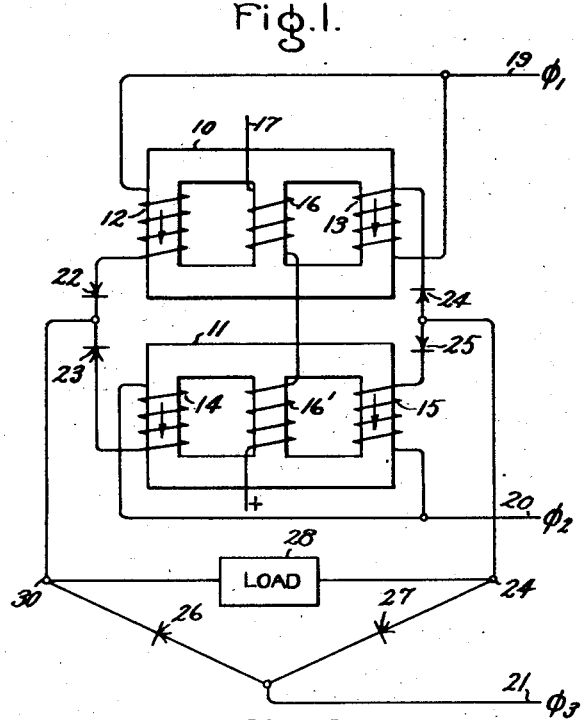

Referring to Fig. 1, I have shown my invention in one form as comprising a saturable reactor means including a pair of three-legged core members 10 and 11 respectively, each having a pair of reactance windings wound on outer legs, and a control winding wound on a central leg thereof. In the drawing, reactance windings 12, 13 and control winding 16 are associated with reactor 10 while reactance windings 14, 15 and control winding 16' are associated with reactor 11. The control windings 16 and 16' are connected in series between suitable control signal input conductors 17 and 18 to provide a single control means for controlling the level of magnetic saturation in both core members simultaneously responsive to the amplitude of a signal voltage supplied between conductors 17 and 18. Three alternating current supplying conductors 19, 20 and 21, one for each phase of a three phase alternating voltage source, are connected through suitable full wave double-bridge current rectifying means, such as by rectifiers 22, 23, 24, 25, 26 and 27, to suitable output terminals 29 and 30 across which a direct current consumption circuit, indicated as load 28, may be connected. Each pair of the reactance windings 12, 13, and 14, 15 are connected in circuit relation with each of two input conductors 19 and 20 respectively to provide four current paths through consumption circuit 28 to the third input conductor 21. Rectifiers 22 through 27 are arranged with their directions of easy current flow such that current flows through the load 28 in only one direction from the conductors 19 and 20 to the conductor 21 during each of four alternations of source current supplied between these conductors during two phases of the three phase source voltage. In the preferred form of my invention illustrated in the drawing, reactance windings 12 and 13 are each connected from conductor 19 through reversely poled rectifiers 22 and 24 to opposite sides of the load 28; reactance windings 14 and 15 are each similarly connected from conductor 20 through reversely poled rectifiers 23, 25 across the load 28, while reversely poled rectifiers 26 and 27 are directly connected from conductor 21 across the load 28. Due to the "double-bridge" type connection of these rectifiers, current can flow in only one direction through the load 28 during the alternations of any phase of the three phase alternating voltage source.

Figure 2:
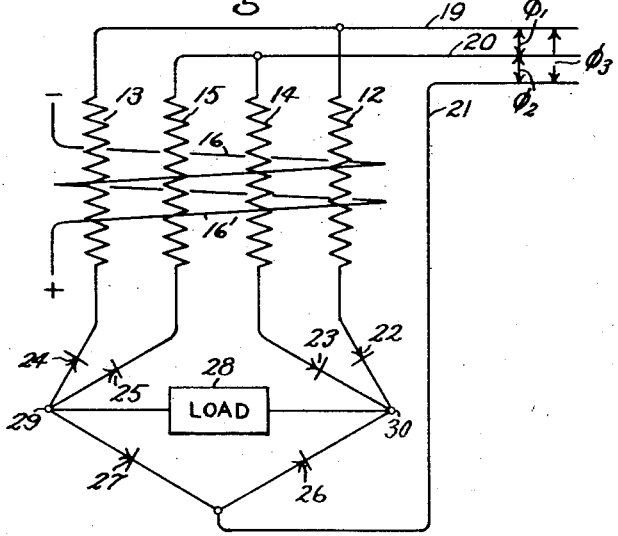

The operation of my magnetic amplifier control system can best be understood by reference to Fig. 2 in which I have shown an equivalent circuit diagram of the device shown in Fig. 1. In Fig. 2 I have represented the voltage between conductors 19 and 20 as phase 1, the voltage between conductors 20 and 21 as phase 2, and the voltage between conductors 19 and 21 as phase 3. Since only four reactance windings are employed in this "double-bridge" rectifier connection, only two of these three phase signals, namely, phase 2 and phase 3, actually contribute to the current that flows through the load 28. Due to the prevalence of currents in the reactance windings 12 through 15 as a result of the currents supplied by phase 2 and phase 3, any current which might flow through these reactance windings and load 28 as a result of the phase 1 cycle, is suppressed. Consequently, only four unidirectional pulses of current pass through the load 28 during one full cycle of three phase alternating voltage source, and the magnitude of these four pulses may be controlled by the amplitude of a control voltage supplied to the control windings 16 and 16' so as to vary the time of saturation of the reactors 10 and 11 associated with windings 12 through 15. Reactance windings 12 through 15 are wound or connected in the circuit so as to produce a magnetic flux which is in the same direction in each of the saturable reactors 10 and 11, as indicated by the arrows, so that a change in control winding flux and consequent change in the saturation time of the reactors occurs in the same direction in both reactors.

The specific paths of current for the phase 2 cycle and the phase 3 cycle which produce controllable pulses of current through the reactance windings 12 through 15 will now be described. During phase 2 voltage alternations of one polarity, current flows through reactance winding 14 and rectifiers 23 and 27, while opposite polarity alternations produce currents in reactance winding 15 and rectifiers 25 and 26. Similarly, during phase 3 voltage alternations of one polarity, current flows through reactance winding 12 and rectifiers 22 and 27, while opposite polarity alternations of phase 3 produce a current flow through reactance winding 13 and rectifiers 24 and 26. During voltage alternations of phase 1 the only available path in one direction is through both reactance windings 12 and 15 as well as rectifiers 22 and 25, while the only available path for alternations of opposite polarity is through reactance windings 13 and 14 and rectifiers 24 and 23. The greater impedance that results from the fact that an additional reactance winding is included in these current paths of phase 1, is normally sufficient to restrict the current flow during this phase to a very small amount since the decreased flux produced by the reactance windings in each circuit path will normally not produce saturation in the associated reactors before the next current wave due to phase 2 or phase 3 is received by the reactance windings involved.

It will thus be seen that four controllable pulses of current corresponding to the rectified alternations of phase 2 and phase 3 are provided for every cycle of three phase power supply voltage. It has been found that this circuit provides approximately 60% more output voltage than a comparable single phase circuit.

It will be appreciated that rectifiers 26 and 27 are in circuit relation with both effective phase cycles, namely phase 2 and phase 3, and thus eliminate the necessity for a separate pair of balancing rectifiers for the double bridge. Moreover, these rectifiers 26 and 27 also function as commutating rectifiers for preventing any undesirable voltage feedback if an inductive element is employed for load 28.

It is to be understood that many modifications of the above-described embodiment of my invention may be made. Although I have shown, for example, a single control winding in conjunction with each reactor core member 10 and 11, additional magnetic saturation controlling windings for the purpose of varying the magnetic operating point or for connection as a feedback winding, may also be employed. I intend, therefore, by the appended claims to cover all such modifications as fall within the true spirit and scope of my invention.

What I claim as new and desire to secure by Letters Patent of the United States is:

1. A three phase control system comprising, saturable reactor means having two pair of reactance windings and at least one control winding for controlling the level of magnetic saturation of said reactor means, a direct current consumption circuit, three input conductors for connection to a three phase alternating voltage source, and full-wave double-bridge current rectifying means connected in circuit relation with each conductor and said consumption circuit to enable current to flow through said consumption circuit in only one direction from two of said conductors to a third conductor during each of four alternations of source voltage supplied between said latter two conductors and said third conductor during one three phase cycle of alternating voltage supplied to said input conductors, and each pair of said reactance windings being connected in circuit relation with each of said two conductors and said consumption circuit to receive a respective one of the currents produced by said four alternations of source voltage.

2. A three phase control system comprising, saturable reactor means having four reactance windings and a control winding for controlling the level of magnetic saturation in said reactor means, three input terminals, a pair of output terminals, and full wave double-bridge current rectifying means comprising six rectifiers, each of a first pair of said rectifiers being connected in reversed conductive relation with a different one of a first pair of said reactance windings to provide a separate conduction path from different output terminals to the same first one of said input terminals, each of a second pair of said rectifiers being connected in reversed conductive relation with a different one of a second pair of said reactance windings to provide a separate conduction path from different output terminals to the same second one of said input terminals, and a third pair of said rectifiers each connected in reversed conductive relation from different output terminals to a third of said input terminals to effect a unidirectional current flow through a load connected across said output terminals during the four alternations of a three phase source voltage supplied between said first and third input terminals and between said second and third input terminals.

RAYMOND E. MORGAN.

REFERENCES CITED

The following references are of record in the file of this patent:

UNITED STATES PATENTS

| Number | Name | Date |
|---|---|---|
| 1,844,704 | Thompson | Feb. 9, 1932 |
| 1,955,322 | Brown | Apr. 17, 1934 |
| 2,552,952 | Gachet et al. | May 15, 1951 |